Figure 1:
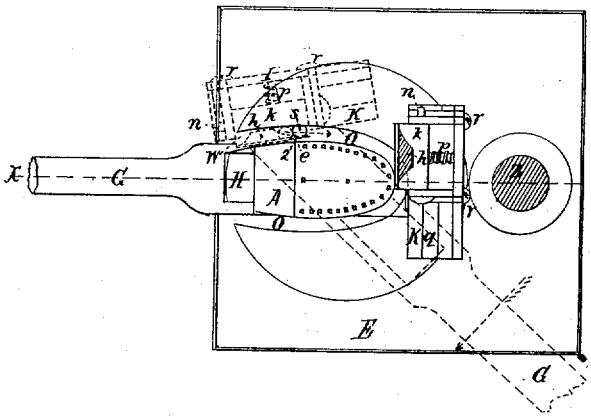

G. W. ELLIS.

Improvement in Machine for Nailing Heels to Boots and Shoes.

No. 5,079. Reissued Oct. 1, 1872.

Witnesses.

Jno. A. Brown,
J. P. Chapman

J. W. Brooks
Trustee
by Crosby & Gould &
John S. Halsted
Attys

UNITED STATES PATENT OFFICE.

GEORGE W. ELLIS, OF LYNN, MASSACHUSETTS, ASSIGNOR, BY MESNE ASSIGNMENTS, TO JAMES W. BROOKS, TRUSTEE.

IMPROVEMENT IN MACHINES FOR NAILING HEELS TO BOOTS AND SHOES.

Specification forming part of Letters Patent No. 41,038, dated December 22, 1863; reissue No. 5,079, dated October 1, 1872.

*To all whom it may concern:*

Be it known that I, GEORGE W. ELLIS, of Lynn, in the county of Essex and State of Massachusetts, have invented certain Improvements in Machines for Nailing Heels to Boots and Shoes, and trimming them, of which the following is a specification:

The invention relates to the preparation of boot-heels, to their application to the soles of boots and shoes, and to trimming their curved edges. As regards the manufacture or preparation of the heels, the invention has particular reference to compressing and compacting the heel-lifts and securing them permanently together and upon the sole of the boot or shoe. The invention consists in certain features of arrangement of the mechanism, and in the combination with the heel-nailing mechanism of a trimming mechanism; also, in the employment of a nailing mechanism and trimming mechanism, whose action is to a greater or less extent determined by a guiding device, with which the heel-blank is furnished by the action of the mechanism that punches the nail-holes, so that the nail-driving mechanism may operate with accuracy, and the trimming mechanism trims with especial reference to the position of the nails, keeping equidistant therefrom, and trimming close to them without possibility of cutting into them. The heels before they are applied to the boots by this machine are built up of lifts cut out, approximating the form of the finished heel, by dies, and temporarily secured together in a suitable machine, the heel-blank made up of such lifts having a form approximating to the form of the finished heel. In the machine in which the lifts are secured together to form a blank, the holes for the nails may be made, and two or more nails may be partly driven into and through the heel, said nails being left projecting from the top lift, and serving not only to hold the lifts together temporarily, but also as guides by which the heel-blank may be properly placed in the present machine, in which the blank is secured to the sole of a boot or shoe.

The drawing represents a machine embodying the invention.

Figure 5:
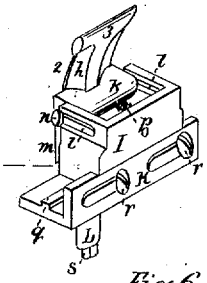
Figure 6:
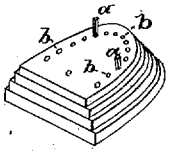
Figure 3:
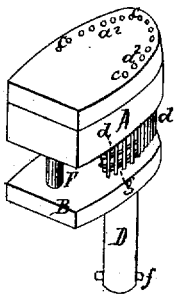
Figure 2:
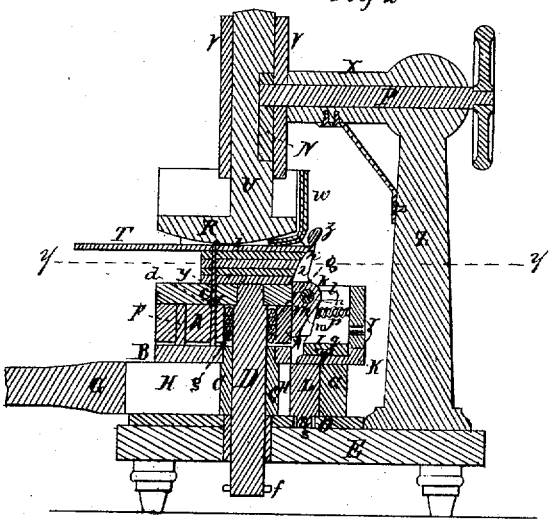
Figure 4:
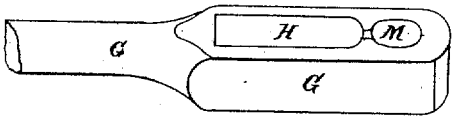

Figure 1 is a plan of the machine. Fig. 2, a vertical section on the line *x x* of Fig. 1, the shoe being inserted. Fig. 3, a view of the nailing-block detached. Fig. 4, a view of the knife-lever detached. Fig. 5, a view of the shaving-knife and the parts immediately connected therewith. Fig. 6, a view of a heel-blank as prepared for nailing on.

A heel-blank to be nailed by this machine is represented in Fig. 6, the holes *b* for the nails having been punched, and the guide-nails *a* inserted to prepare the heel-blank for the operation of this machine. The nailing-block A is perforated with a series of holes, *c*, exactly conforming in position with the awl-holes *b* in the heel-blank, and in each of these holes, *c*, works a driver, *d*, the lower end of which rests upon the stationary driver-bed B upon the top of a hollow post, C, rising from the bench E. The nailing-block A is secured to a rod or shaft, D, which slides in the post C, and between the bed and the block there is a spring, *g*, which raises the block A to the proper height, where it is arrested by a pin, *f*, in its lower end coming in contact with the underneath surface of the bench E. A pin-guide, E, rising from the bed E, enters a corresponding hole in the block A and prevents the latter from turning. When pressure is applied to the nailing-block, it is forced down upon the bed, Fig. 2, the spring *g* yielding, and the drivers rising through the holes in the block A, so as just to reach the upper surface of the block. The knife-lever G (which may be used in connection with the nailing mechanism, and which is seen in plan in Fig. 1, in section in Fig. 2, and in perspective in Fig. 4,) has a long slot, H, in its center, of a width that will just receive the post C within it, so that the lever may turn freely around this post, and at the same time have a considerable range of motion in the direction of its length. The motions of the knife-lever are governed as follows: The knife *h* (seen in Fig. 2 in the act of shaving the heel) is formed so as to give the proper curve to the heel, and is secured to the knife-head *k*, and has a prolongation or tail-piece, *m*, which rests against the nailing-block A. The head *k* has two bearings or pivots, *n*, which slide in slots *l* in the knife-block I, and it is forced up toward the heel, Figs. 1, 2, and 5, by the spring *p*, the knife being thus allowed to vibrate on its pivots *n*, and to move longitudinally in the slots *l*. Above the knife is a fender, *z*, which rests against the upper leather *w*, and protects it from being cut by the operation of shaving the heel. The knife-block I slides upon dovetailed ways *q* on the knife-carriage K, and is secured in position thereon by screws *r*. Down from this carriage projects a post, L, which fits closely but turns freely in the hole M, Fig. 4. The post terminates in an elongated or double pin, *s*, which fits snugly but slides freely in a curved groove, O, upon the upper surface of the bench E. The curve of the groove O corresponds generally with that of the nailing-block A, but will allow this block to be varied sufficiently for all the different sizes of heels that may be required. The knife *h* is adjusted by means of the screws *r*, so that its edge 2 shall be in a vertical plane passing through the center of the post L and pin *s*. The post L is passed down through the hole M, and the knife-lever G is turned, so that the elongated pin *s* will enter the slot O at the point W, Fig. 1, and as the lever is carried round the pin moves in the direction of its arrow, and as it moves it turns the carriage K and knife-block, so as to cause the knife-blade constantly to make a tangent to the bed B and block A. The knife *b* is adjusted by means of the screws *r*, so that its edge 2 shall be in a vertical plane passing through the center of the post L, and thus the edge of the knife is always kept in the proper cutting position.

In operating the machine, the boot or shoe, after having been soled, and while upon a last, may have its heel secured to it by nails, and the heel then shaved or trimmed. In the machine represented in the drawing only the rear portion of the shoe is shown, and the follower R takes the place of the last; but the shoe may be heeled before the last is withdrawn. In Fig. 2, T denotes the sole, which may be secured to the insole $a^1$ and upper leather *w* by pegs, or in any ordinary way. The follower R is attached to the lower end of a rod or bar, U, which slides up and down in bearings V attached to an arm, X, projecting from the standard Z rising from the bench E. The bar U is operated by the eccentric N upon the end of the shaft P, which runs through the center of the arm X.

When not in operation, the nailing-block is elevated a short distance above the bed B, as seen in Fig. 3, and the drivers *d* are then sufficiently far below the mouths of the holes *c*, to permit a nail to be dropped into each of the holes, except those that come opposite to the guide-nails *a*, Fig. 6. The nails being thus dropped into the holes with their points upmost, the heel-blank is placed upon the nailing-block, the guide-nails *a* being placed in their proper holes $a^2$, into which, as before stated, no nails were placed. These guide-nails thus serve the purpose of instantly placing the heel-blank in the proper position, so that each hole in the block shall correspond with a hole in the heel. The shoe is now placed upon the heel, Fig. 2, a proper guide or gage projecting from some stationary part of the machine arresting the shoe in the right position with respect to the nailing-block A. The shaft P is turned, and the follower R (or the last, if the latter have not been withdrawn from the shoe, together with the shoe, heel, and the nailing-block A, is forced down until the latter bears upon the stationary bed B. While this is taking place the drivers have forced the nails up into the holes in the heel-blank, or a portion of them through the sole and insole, and against the bottom of the follower R (or of the last) which is iron-plated, to rivet them, and compact and secure the heel firmly, the guide-nails *a*, Fig. 6, being at the same time driven. One of the nails is seen at *y*, Fig. 2, riveted against the follower. The descent of the follower (or of the last) is graduated with reference to the thickness of the heel, so that the latter may be submitted to a great pressure, not only that it may be thus nailed and retained in a solid and compressed state, but also that it may be shaved while under pressure, which operation is performed as follows: Starting with the knife lever in the position as represented in red in Fig. 1, and moving this lever in the direction of its arrow, the knife commences to cut upon the corner *e* of the heel, and is carried round until it has shaved the entire heel, the tail *m* of the knife resting against the nailing-block A, and the fender *z* against the upper leather of the shoe, as already described, and thus the block A and the upper leather serve as guides for the knife, while the fender prevents the knife-edge from coming in contact with the upper leather.

For certain work the sole and heel may be temporarily secured together in the machine that punches the nail-holes, the guide-nails being of sufficient length to penetrate partly into the sole, and the sole and heel being then shaved and secured together in the present machine, and before being secured to the shoe. The heel and the portion of the sole to which it is attached are then secured to the shoe by six or more nails driven into holes left vacant for the purpose, and clinched upon an iron-plated last. In such case the nailing-block and the follower R will serve as guide for the knife, the fender resting against the edge of the follower. This method of shaving the heel and sole before they are secured to the shoe gives a much better opportunity of finishing the "rand" than where the heel is shaved after it is secured to the shoe.

Any other method or machinery than that described above may be employed for the purpose of depressing the follower R, or the last, at the proper time.

In a machine for operating with heels of different heights a different knife will be required for each height of heel, in order that the fender may bear upon the extreme bottom of the upper leather, which is technically called the "top edge," as seen in Fig. 2; or the same knife may be used for heels of different heights; but in such case the fender must be made adjustable upon the knife and be secured by screws thereto.

In order that the inside of the boots may be concave, to correspond with the convexity of the foot at the heel, it is customary in building up heels to employ what is called a "split lift," by which the top of the heel is made concave. By the use of this machine this concave form is given to the heel without the necessity of resorting to the "split lift," as follows: The follower R or the last is made convex to correspond to the shape of the foot, and the heel is subjected to sufficient pressure in the machine to produce the requisite concavity of the sole by the compression of the leather. It would, however, be manifestly of no avail thus to shape the heel if it were again to be released from pressure before being permanently secured in shape. This is accomplished by driving the nails while the heel is under pressure; it is thus held by the nails in the shape in which it is compressed by the machine. It is evident, however, that heels built up with a "split lift" may equally well be nailed and shaved upon this machine. By shaving the heel while under pressure a much cleaner and better cut can be made.

It will be perceived that by the employment of the spring *p* behind the shaving-knife it is practical to operate upon heels of different sizes with the single stationary groove O by simply changing the nailing-block A. By this means the machine is greatly simplified.

*Claims.*

1. In the process of heeling a boot or shoe by temporarily or partially uniting the heel-lifts to form a blank, punching the blank with nail-holes, supplying the nail-holes with nails and afterward driving the nails to permanently compact and unite the lifts together and to the sole, positioning or registering the heel for the action of the driving mechanism by means of a gage, guide, index, or register, predetermined by and required to correspond with registering or guiding devices upon the nail-hole-punching machine, substantially as described.

2. In trimming the heel of a boot or shoe, positioning the heel for the action of the edge-trimming cutter by means of guides, predetermined by the action of the machine that punched the nail holes, substantially as described.

3. The combination of the follower R and the nail-blocks A B, relatively arranged and operating substantially as shown and described.

4. The knife carriage or block I, that traverses through, or is guided in or by, a curved slot, and moved by a slotted lever, and the hanging of the knife therein by pins or trunnions working in slots *l*, and guided by the tail-piece *m* and fender *z*, substantially in the manner and for the purpose set forth.

JAMES W. BROOKS,
*Trustee.*

Witnesses:
FRANCIS GOULD,
M. W. FROTHINGHAM.